US010452817B1

(12) United States Patent
Mingyan et al.

(10) Patent No.: US 10,452,817 B1
(45) Date of Patent: *Oct. 22, 2019

(54) FILE INPUT/OUTPUT REDIRECTION IN AN API-PROXY-BASED APPLICATION EMULATOR

(75) Inventors: Sun Mingyan, Nanjing (CN); Lo Chien Ping, Yonghe (TW); Fan Chi-Huang, Sanchong (TW)

(73) Assignee: TREND MICRO INC, Shibuya-Ku, Tokyo (JP)

( * ) Notice: Subject to any disclaimer, the term of this patent is extended or adjusted under 35 U.S.C. 154(b) by 1669 days.

This patent is subject to a terminal disclaimer.

(21) Appl. No.: 12/420,525

(22) Filed: Apr. 8, 2009

(51) Int. Cl.
*G06F 21/00* (2013.01)

(52) U.S. Cl.
CPC .................................... *G06F 21/00* (2013.01)

(58) Field of Classification Search
USPC .......................................................... 726/30
See application file for complete search history.

(56) References Cited

U.S. PATENT DOCUMENTS

| 7,395,394 | B2 * | 7/2008 | Federa et al. | 711/163 |
| 9,274,974 | B1 * | 3/2016 | Chen | G06F 12/109 |
| 2004/0123136 | A1 * | 6/2004 | Jung | G06F 8/67 |
| | | | | 726/24 |
| 2005/0268298 | A1 * | 12/2005 | Hunt | G06F 9/4856 |
| | | | | 718/1 |
| 2008/0162932 | A1 * | 7/2008 | Challener et al. | 713/168 |
| 2008/0243465 | A1 * | 10/2008 | Bohizic et al. | 703/23 |
| 2009/0036111 | A1 * | 2/2009 | Danford | H04L 41/0893 |
| | | | | 455/419 |

OTHER PUBLICATIONS

White, Ron, "How Computers Work", Millennium Ed., Que Corporation, Indianapolis, IN, 1999.*

* cited by examiner

*Primary Examiner* — Chrystina E Zelaskiewicz
(74) *Attorney, Agent, or Firm* — Beyer Law Group LLP (57) ABSTRACT

Applications running in an API-proxy-based emulator are prevented from infecting a PC's hard disk when executing file I/O commands. Such commands are redirected to an I/O redirection engine instead of going directly to the PC's normal operating system where it can potentially harm files in on the hard disk. The redirection engine executes the file I/O command using a private storage area in the hard disk that is not accessible by the PC's normal operating system. If a file that is the subject of a file I/O command from an emulated application is not in the private storage area, a copy is made from the original that is presumed to exist in the public storage area. This copy is then acted on by the command and is stored in the private storage area, which can be described as a controlled, quarantined storage space on the hard disk. In this manner the PC's (or any computing device's) hard disk is defended from potential malware that may originate from applications running in emulated environments.

8 Claims, 9 Drawing Sheets

FILE INPUT/OUTPUT REDIRECTION IN AN API-PROXY-BASED APPLICATION EMULATOR

CROSS-REFERENCE TO RELATED APPLICATIONS

The present invention is related to U.S. patent application Ser. No. 12/420,508, titled MALWARE PROTECTION USING FILE INPUT/OUTPUT VIRTUALIZATION, filed on the same day, which is hereby incorporated by reference in its entirety.

BACKGROUND OF THE INVENTION

1. Field of the Invention

The present invention relates generally to defending computer systems from malicious attacks. More specifically, the present invention relates to preventing unauthorized or unverified applications from infecting computing devices with malware.

2. Description of the Related Art

Current approaches to preventing malware from infecting a computing device may involve examining the operating behavior of the device. One way of tracking the behavior of a computer is utilizing a so-called "application emulator" program. Application emulator programs are used to measure and observe how a computer or any type of computing device operates or behaves when executing an application and detects potential malware through these measurements and observations. These emulator programs ("emulators") enable emulation of an operating environment, creating a so-called "sandbox" area in which certain application programs can execute. By operating or executing in this sandbox, the applications are prevented from harming components of the computer—such as mass storage components and processors—or from corrupting data on the computer, in the event that the applications are malicious, unpredictable, or harmful in any manner.

One specific type of emulator that is often used for tracking behavior for malware detection is an API-proxy-based application emulator. This kind of emulator allows application programs that are operating in the sandbox to have full access to the computer's persistent storage component, such as a hard disk. For example, the emulator intercepts system calls made by an application and re-directs certain ones, such as API (application programming interface) requests, to modules in the operating system. As noted, the emulator can monitor the behavior of an application by virtue of the application running in the emulated environment (the application is also said to be running on a "virtual CPU"). All or most system calls go through an API-adaptor in the emulator, which enables monitoring of API call sequences to the operating system.

However, as a consequence, the hard disk or other primary persistent storage component becomes vulnerable when the API-adaptor redirects API calls to the operating system. For example, file input/output (I/O) operations are able to go directly to the hard disk. By allowing file I/O commands coming from a potentially harmful application executing in an emulator environment to access the hard disk, data stored on the disk is in danger of being corrupted or infected. This type of damage is sometimes referred to as out-of-box damage (the "box" referring to the sandbox discussed above).

Another way data in a hard disk may be infected or corrupted arises from the disabling or unavailability of so-called anti-virus "in-the-cloud" services normally utilized by the computer. As a software distribution model in which security services are hosted by vendors and made available to customers over the Internet, such services have been advocated as a next generation model for virus detection.

This approach to defending computers against malware employs a set of "cloud" (i.e., Internet) servers which analyze and correlate new attacks and generate vaccinations online. With this infrastructure, in-the-cloud services can sharply reduce the computing burden on client computers, and can make security products more effective in stopping new malware. Furthermore, customers do not need to install a full copy of the virus signature file, and need only keep a small set of "cloud signatures" and, in some cases, an in-the-cloud scan engine software module or agent. The benefits include easy deployment, lost cost of operation, and fast signature updating.

However, an anti-virus "in-the-cloud" service may become ineffective or disabled under certain circumstances. For example, a network connection may be lost if there are denial-of-service attacks on the "cloud" servers. In another scenario, the client computer may go offline, in which case the in-the-cloud service becomes inaccessible. When the in-the-cloud service is not available, the client computer currently has few options for protecting itself against malware. And when not protected, the hard disk is at risk of being corrupted. One option is using quarantine technology to prevent the computer user from accessing any potentially dangerous files or applications, for example, applications that are downloaded or copied from unauthorized sources, such as portable devices (e.g., digital cameras, cell phones, media players).

However, quarantine technology is generally not a practical solution because often a user is blocked from accessing many safe and conventional applications stored on the hard disk, including those that the user accesses frequently during normal use. Many such applications may be quarantined on the hard disk and, thus, inaccessible to the user. This approach may significantly hamper use of the computer and frustrate the user. A blanket quarantine approach which places any and all files or applications from unknown or unauthorized sources is likely to have many "false-positives." That is, many applications that are safe and are used by the user regularly may be quarantined and inaccessible.

Thus, it would be desirable to implement an emulator that cannot corrupt a hard disk. It would be further desirable to have an effective anti-virus capability for a computer when the computer is temporarily unable to access in-the-cloud anti-virus services and that at the same time will not significantly hamper normal use of the computer.

SUMMARY OF THE INVENTION

Various different types of emulator programs are used in computing devices for wide range of reasons. One type of emulator is the so-called API-proxy-based application (behavior) emulator which runs, often on a PC, to examine the behavior of an application in an environment where execution of the application generally cannot do harm to the PC. That is, if the application is infected with malware and executes in the API emulator, it will generally not affect other parts of the PC. One problem, however, is that file I/O commands that are issued by the "emulated application" may still access and manipulate files that are stored on the PC's hard disk, potentially infecting those files and corrupting the hard disk. In various embodiments of the present invention, file I/O commands coming from emulated applications (or from the emulator) are re-directed to an I/O redirection engine instead of to the PC's normal operating system. The redirection engine accepts file I/O commands from emulated applications and ensures that those commands only affect files that are stored in a private storage area on the hard disk that may be described as a quarantine storage area. This allows for successfully isolating the file I/O commands of the emulated application from potentially causing infection of the public storage area of the hard disk where the vast majority of files and data of the PC are stored.

The file I/O commands from the emulated application are examined in the redirection engine to determine which files are subject to the command. If a file is already in the private, controlled storage area on the hard disk, the command is executed using the quarantined copy of the file (the original of the file is in the public storage area). If a file is not already in the private storage area, it is copied from the public storage area and the file copy is used for executing the file I/O command and then stored in the private storage area. In this manner, file I/O commands from emulated applications cannot inadvertently corrupt or damage files in the PC's hard disk and can only manipulate files and data in a controlled separate area not accessible by the normal operating system of the PC.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

As discussed above, a computer can be infected by having applications containing or enabling malware execute and access a persistent storage component on the computer. File input/output (I/O) commands issuing from applications executing in a sandbox environment or that are downloaded from unknown sources, such as portable devices, can directly access a computer's hard disk. In this manner, all forms of data on the disk may be infected or corrupted, causing damage to the hard disk itself or to other hardware and software components of the computer.

Redirection of File I/O Commands in an Emulator Environment

In a first embodiment, as discussed above, an emulator, such as an API-proxy-based application emulator, creates a sandbox environment in which an application can run without causing harm to a computer. A sandbox may be described as an operating environment that is separate from the computer's normal or conventional operating system. However, certain system calls, specifically, file I/O commands from the application can directly access the computer's persistent storage area. In one embodiment, an I/O redirection engine analyzes the file I/O commands and uses a quarantined or private storage area in the persistent storage area exclusively for suspicious or unverifiable applications (the term "applications" is used herein to refer to include software applications, computer programs, and executable computer instructions contained in files). The embodiments discussed below are illustrated using a client or personal computer (PC), as an example of a computing device. The various embodiments described below apply to any type of computing device having a persistent storage area, such as cell phones, media players, and other "smart" handset computing or communication devices. The PC implementing the I/O redirection engine and private storage area may be a stand-alone computing device or a component in a network. The term "hard disk" is used herein to refer to a primary persistent storage area (internal or external), typically a mass storage area, although, as is known in the art, a persistent storage area may be implemented using other types of hardware, such as persistent memory and USB drives, depending on the device.

In the various embodiments, a hard disk has a public area and, as noted, a private area. The public area, having a first range of addresses, is the conventional or normally accessible section of the hard disk used by routine applications, operating system modules and functions, and various components of the PC during its normal course of operation. The private storage area of the hard disk, assigned a second range of addresses, is used to store only certain files selected in the I/O redirection engine using processes discussed below. The private storage area is an area of persistent storage that is sequestered or, as noted, quarantined from the rest of the hard disk. It is used only by applications running in the emulator environment; applications that are running in the PC's normal operating environment do not access it. It is intended for executing file I/O commands from applications running in the emulator environment (created by the API-proxy-based emulator program). In other embodiments, the private storage area is also referred to as a virtual storage space. The term "virtual" is used because the emulator environment or sandbox may also be characterized as a virtual operating system environment, depending on the context. This concept also extends to describing the CPU; there is, of course, an actual CPU in the PC and a virtual CPU in the emulator. In this manner, if a file I/O command from an emulated application requires directly accessing the hard disk, the command is re-directed to the private storage.

When reference is made simply to the "hard disk," it can be assumed herein that the public area of the hard disk, as described above, is being referenced.

An application program is basically a series of computer instructions that are executed by a processor in a PC. If there is an emulator executing on the PC, certain software applications may run in the emulator (i.e., virtual) environment created by the emulator. These applications execute using a virtual CPU created by the emulator that is used to interpret instructions of the emulated applications. An emulator may also be described as a platform that enables execution of an emulated application on the virtual CPU.

Figure 1:
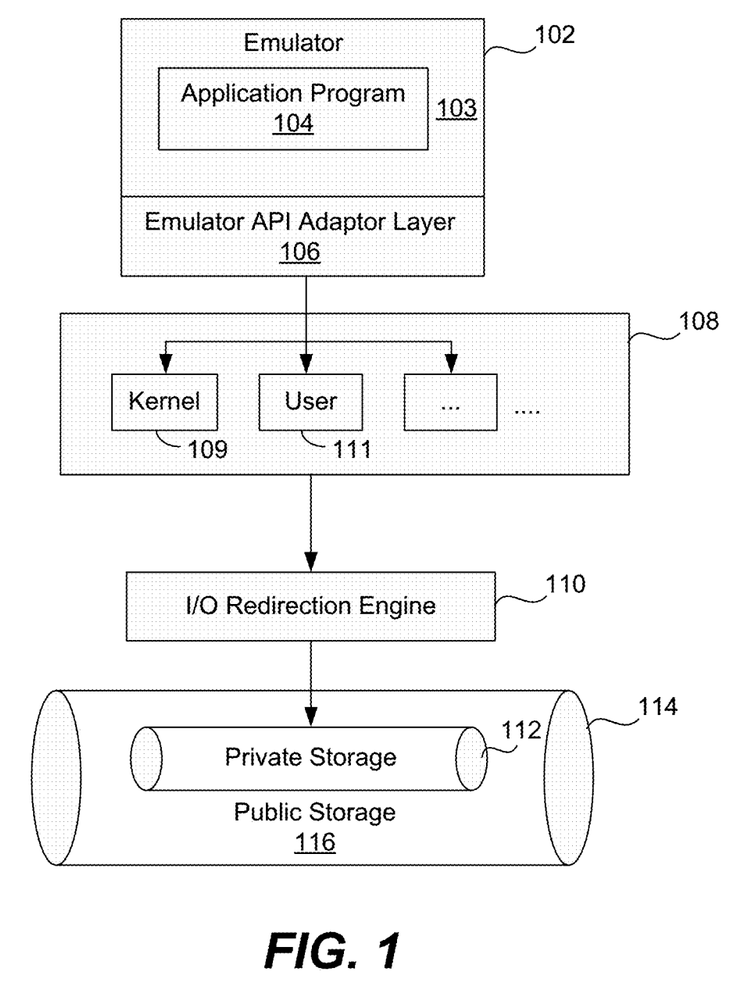
FIG. 1 is a logical block diagram of modules and components in a computer for providing file I/O redirection from an emulator in accordance with a first embodiment.

FIG. 1 is a logical block diagram showing relevant modules and components in a PC for implementing file I/O command redirection in accordance with the first embodiment. An API-proxy-based emulator 102 has an application 104 executing in an emulated environment 103 (application 104 may be referred to as an "emulated application"). In the described embodiments an API-proxy-based application emulator is used to illustrate the invention. The same concepts described here, however, can be used with any type of emulator that relies on the real operating system of the PC to perform file I/O commands. It may also be noted that there are emulators that are similar to an API-proxy-based emulator but has a somewhat different name while performing similar functions. However, as noted, the common feature is that the emulator performs file I/O commands. As noted, the environment created by emulator 102 provides a platform in which application 104 can execute on a virtual CPU. Emulator 102 has an API adaptor layer 106 for making API calls transmitted by or originating from emulated application 104. API adaptor layer 106 may be described as an API interface component of emulator 102. Adaptor layer 106 transmits API calls from emulated application 104 to an operating system (O/S) 108 which executes various conventional O/S modules. For example, in the Microsoft O/S these modules may include a kernel32.dll module 109, user32.dll module 111, and so on. Because of the different operating environments (emulated vs. real) involved in the various embodiments, it is helpful to note that O/S 108 is the actual operating system of the PC and is not created by or dependent on emulator 102. Operating system 108 communicates with an I/O redirection engine 110 which accepts as input various types of commands from O/S 108, including file I/O commands and other types of commands, for example, registry I/O commands. In one embodiment, file I/O commands originate from emulated application 104 and are redirected or re-routed by redirection engine 110 to a private storage area 112 in hard disk 114. Also shown in hard disk 114 is a public storage area 116. In one embodiment, redirection engine 110 is a software module that executes on the real CPU, rather than in the emulator environment. Redirection engine 110 is described in greater detail in FIG. 3.

Figure 2:
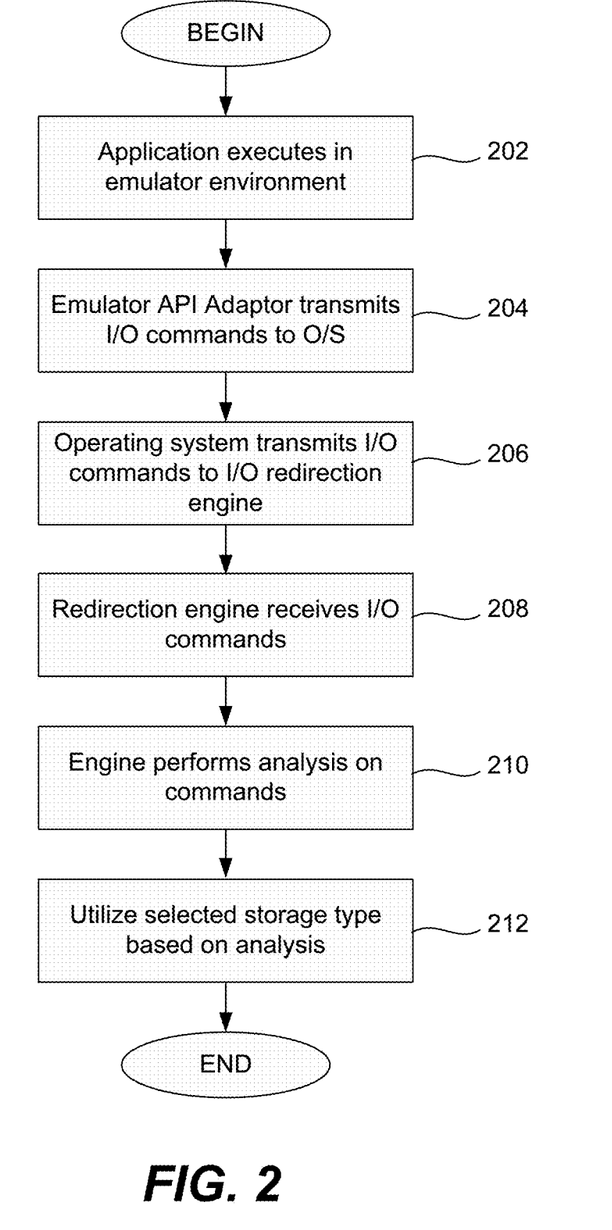
FIG. 2 is a flow diagram of a process for utilizing a private storage area in a hard disk when processing file I/O commands that come from emulated applications in accordance with the first embodiment.

FIG. 2 is a flow diagram of a process for utilizing a private storage area in a hard disk when processing file I/O commands in accordance with one embodiment. At step 202 an application executes in an emulated environment created by an API proxy-based application emulator, such as emulator 102 shown in FIG. 1. As discussed above, the emulator implements a platform on a virtual CPU enabling execution of the emulated application. The emulated application may be any type of user or system application or other type of program, including portable device applications downloaded or copied from devices attached to the PC. As is the case for most applications, during execution, emulated applications generate file I/O commands for performing operations on one or more files stored in the hard disk or for creating new files in the hard disk.

At step 204 the API adaptor layer of the emulator transmits file I/O commands received from the emulated application to the operating system (O/S). These file I/O commands come from the emulated application as it executes in the emulator environment. File I/O commands may include operations to write to or read from a file, delete a file, or create a new file in the hard disk, as well as other commands such as file registry I/O commands. The O/S receives file I/O commands (as well as other types of commands) from all applications executing on the PC, not only from applications executing in the emulator. At step 206 the O/S transmits the file I/O commands to the redirection engine. The redirection engine may register itself with the operating system when the engine initially starts up or executes. The registration with the operating system may be needed to specifically receive file I/O commands (as well as registry I/O commands, if needed). At step 208 the redirection engine receives file I/O commands from the O/S. This is done using a command receiving module in the redirection engine. At step 210 the redirection engine analyzes each file I/O command. This analysis effectively functions as a filter for the PC's persistent storage accessing subsystem and is described in FIG. 3. It is worth noting that the analysis at step 210 is of the file I/O command itself and not of the file that is the subject of the command (i.e., the file on which the command is operating on or creating). This analysis is done using a command analysis module in the redirection engine.

Figure 3:
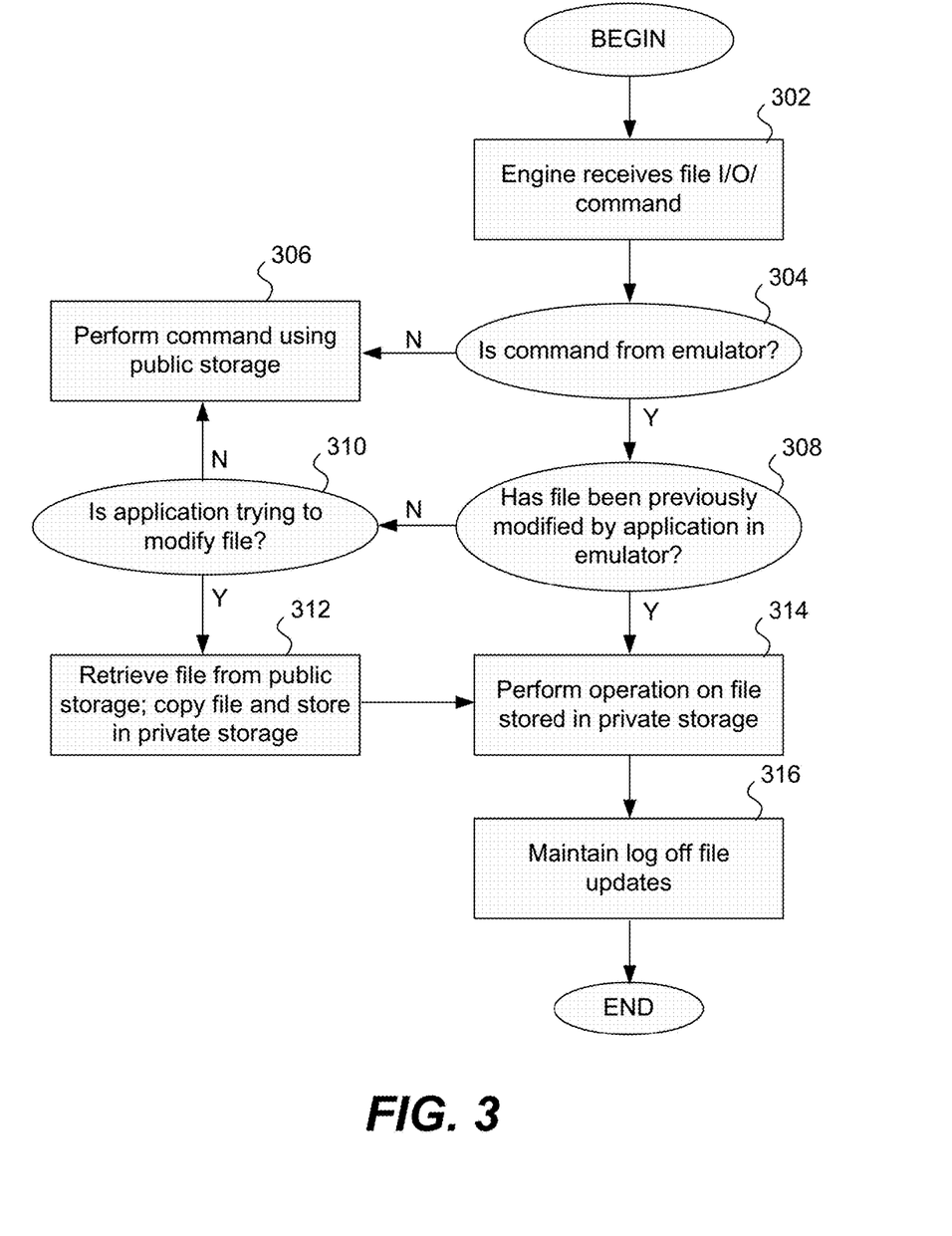
FIG. 3 is a flow diagram showing operations of a redirection engine in accordance with the first embodiment.

At step 212 one of the two storage types is utilized to carry out the file I/O command as described in FIG. 3. As discussed earlier, the storage may be a public storage area or a private storage area, used only by the emulator. The type of storage is determined in the analysis performed at step 210. Once the file I/O command has been executed using the appropriate storage type, the process of redirecting file I/O commands from emulated applications to the hard disk is complete.

FIG. 3 is a flow diagram showing analysis of an I/O command in I/O redirection engine in accordance with the one embodiment. At step 302 the redirection engine receives a file I/O command from the operating system. A file I/O command may issue from an emulated application or from a non-emulated application running in the normal operating environment. At step 304 the redirection engine determines whether the file I/O command was generated from an emulated application running in an API-proxy-based application emulator. Whether a command issues from an emulated application can be determined by examining a process ID or process name associated with the file I/O command. The process name or ID will indicate whether the file I/O command came from an emulated application. In one embodiment, the redirection engine may manage process ID/name changes. Thus, when the emulator quits or stops execution, the emulator will log process ID/names and then remove them. When the emulator launches again, it is essentially able to "remember" the process ID/name by checking the process ID/name log. Other ways to determine if the process is from an emulated application is to check the process path or the process file hash value. If it is not issued from an emulated application, then at step 306 the file I/O command is executed using the persistent public storage area in a conventional manner. If the command was transmitted by an emulated application, control goes to step 308 where the file command is further examined.

Figure 8:
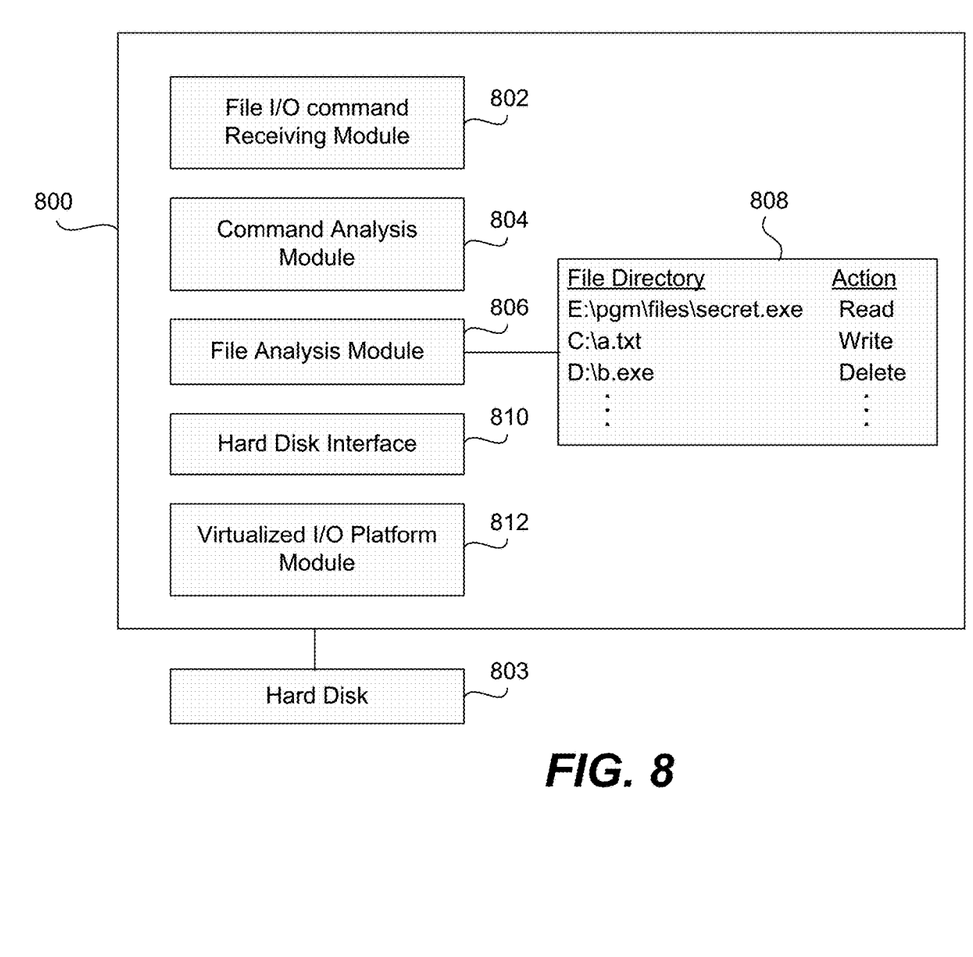
FIG. 8 is a logical block diagram of a redirection engine in accordance with second embodiment.

At step 308 the redirection engine determines whether the file I/O command operates on a file that has previously been written to or operated on by the emulated application or by any other emulated application. In one embodiment, this is done by examining a file update log containing a list of files which have been modified by any previous emulated application. The file update log, as shown in FIG. 8, is created by and maintained by the redirection engine and may be stored in a local memory or on the hard disk. In other embodiments, there may be more than one file update log. For example, there may be one for each emulated application. If the file (i.e., the subject of the file I/O command) has not been previously accessed by an emulated application, control goes to step 310. At step 310 the redirection engine determines whether the file I/O command involves requires writing to, modifying, or deleting the subject file. This may be done by parsing the command using techniques known in the art. If it does not, control goes to step 306 where the file I/O command is executed in a conventional manner using the hard disk. If the file I/O command involves writing to, modifying or deleting the file, control goes to step 312 where the redirection engine retrieves the file from the public storage area in the hard disk and makes a copy of the file. The redirection engine stores this copy in the private storage area of the hard disk. Control then moves to step 314.

Referring back to step 308, if the file was previously modified by an emulated application, control goes to step 314 where the file I/O operation is performed on the copy of the file stored in the private storage area. As noted, determining whether it was previously modified is done by examining the file update log. It is during execution of the file I/O operation when potential harm to the PC, such as corruption of the hard disk, injection of malware, and the like, may occur. Modification of the file via a file I/O command from an unverified or untrustworthy application may, for example, introduce a virus into the PC or cause some other malware-related harm. By limiting updates (e.g., write operations) to a copy of the file stored in the private storage area, the redirection engine is safeguarding the hard disk and the rest of the PC from potential corruption and malware.

At step 316 the redirection engine updates the file update log if needed to include the name of the subject file (i.e., whether it has been accessed a first time). As noted, it may use this log to check whether a file has been previously modified by the engine as described in step 308. At this stage the process of the redirection engine processing a file I/O command is complete. In this manner, the redirection engine controls access to the hard disk by applications running in an emulator environment or sandbox, thereby limiting potential out-of-box damage that may be caused by emulated applications.

File I/O Virtualization

As discussed above, another way certain types of applications may maliciously attack a PC via accessing the PC's hard disk involves an anti-virus in-the-cloud scanning service that has been disabled or is inaccessible. When this type of anti-virus scanning is temporarily unavailable for a PC that normally uses it, applications from external sources, such as portable devices or the Internet, present a particular danger. Not checking them at all and allowing them to freely execute on the PC is too risky to be a viable option. On the other hand, putting all of them in quarantine is simply not practical. It is helpful to note that it is assumed that the existing internal applications and files have already been scanned and secured by the in-the-cloud scanning service before it became inaccessible. It is only after the service is unavailable that new, potentially risky new files that come from external sources that need to be handled in a special manner to protect the PC, as described below. Before continuing, it is also helpful to note that the private or quarantined memory area is not a virtual memory, as that term is used in the art. The private memory is a real storage space on the hard disk.

In another embodiment, the I/O redirection engine itself creates a virtualized (virtual) environment in which applications can execute. This virtualized environment has no relationship to virtual memory, which is a different and unrelated concept. In this embodiment, the API-proxy-based emulator does not play a role and the virtualized environment is distinguishable from the emulated environment created by the API-proxy-based application emulator. An application running in the virtualized environment created by the I/O redirection engine may be referred to as a virtualized application. The redirection engine, which may have multiple functions and capabilities, provides a virtualized environment or platform for application execution. This is useful in cases where a PC normally uses an anti-virus in-the-cloud service for detecting malware. As is known in the field of malware protection, an in-the-cloud service utilizes servers distributed over the Internet (or other network) to apply virus signatures used in virus detection, and works in conjunction with a desktop scanning agent that typically resides on the PC.

Figure 4:
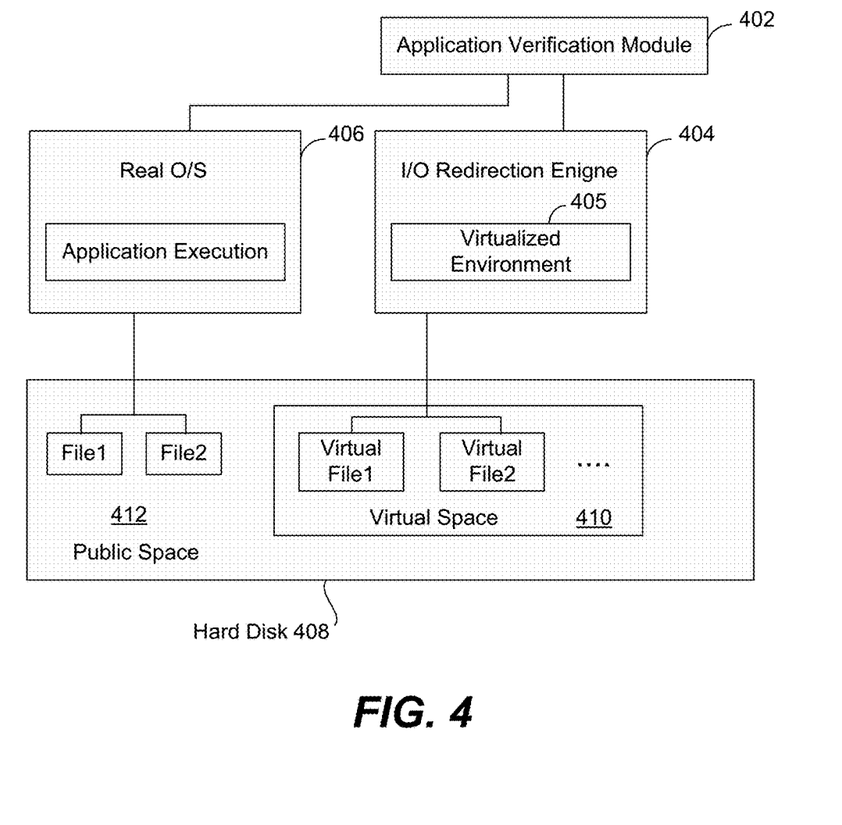
FIG. 4 is a logical block diagram showing components in a virtualized I/O environment in accordance with second embodiment.

FIG. 4 is a block diagram showing components of a computer for providing a virtualized I/O environment in accordance with the second embodiment. An application verification software module 402 scans or examines incoming applications from unknown or unauthorized sources. In one embodiment, module 402 may include, for example, a forensic malware scan component or other suitable malware scan technique, such as whitelisting. Module 402 is in communication with an I/O redirection engine 404 and with the real O/S environment 406 of the PC. An application that can be verified or authenticated is allowed to execute in real O/S environment 406. If it is not considered safe, it executes in a virtualized environment 405 created by I/O redirection engine 404. A hard disk 408 has a virtual space 410 (private storage area) and a public storage area 412. Real O/S 406 accesses files, such as file 1 and file 2, in public storage area 412. Virtualized applications that run in environment 405 of engine 404 access files, such as virtual file 1 and virtual file 2, in virtual space 410. As described above, in this manner, unverified applications are prevented from harming or corrupting files in the public storage of hard disk 408 when performing file I/O commands. In one embodiment, the hard disk does not have a direct relationship with conventional memory address ranges. The redirection engine may allocate a private, controlled, storage area on the hard disk to store potential harmful files. The potential harmful effect of these files is mitigated or eliminated given that they are not located in what may be described as their assumed or typical storage area (i.e., public storage area), but rather are in the controlled quarantined area.

As discussed above, the PC normally uses anti-virus (AV) in-the-cloud scanning services. The PC has an AV agent scanner operating between the applications and the operating system and is deployed to operate in conjunction with the in-the-cloud services on the Internet. However, when the AV in-the-cloud service is unavailable for any one of a number of reasons (e.g., Internet service is down, the AV agent is not executing, the in-the-cloud servers are offline), the virtualized environment 405 operating in I/O redirection engine 404 executes to defend the PC against potential malware from external sources.

Figure 5:
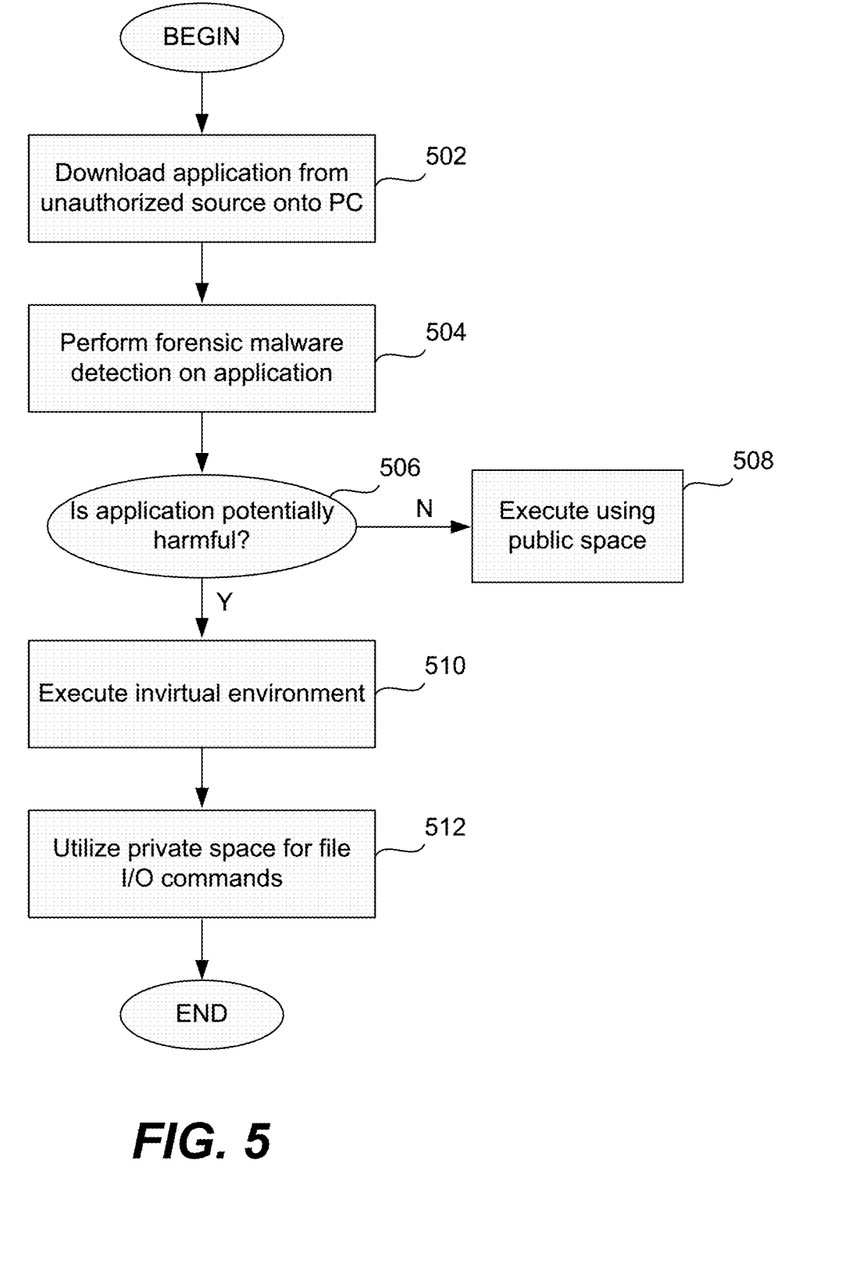
FIG. 5 is a flow diagram of a process of a redirection engine executing an application and utilizing a private persistent storage area for file I/O commands in accordance with the second embodiment.

FIG. 5 is a flow diagram showing a virtualized application executing in an I/O redirection engine and utilizing a private persistent storage area in accordance with the second embodiment. The process of FIG. 5 occurs when the anti-virus in-the-cloud is disabled or unavailable which may occur, for example, when the remote servers for the in-the-cloud scan engine are not accessible or when the PC is not online. It may be noted that the methods described in the embodiments below are not dependent on accessing the Internet. At step 502 the PC receives an application from an external source. The source may be a known source or a new source, and thus, unknown and possibly a source of malware. For example, the source may be an external device connected to the PC, a digital camera or video recorder, a portable hard disk or storage device, a cell phone, another PC (such as a laptop), a portable gaming device, or a media player. The source may also be a Web site, a server on the Internet, or other remote source from where the user is able to download an application. In these scenarios and others, the PC accepts the application as input. If the source is over the Internet, the invention may be used when the online connection is lost before the PC is able to scan the application using the in-the-cloud service or when the AV cloud service is unavailable for other reasons.

At step 504, the application is scanned for viruses using anti-virus scan techniques that do not require accessing the Internet (as in-the-cloud scanning does). For example, the PC may perform a so-called forensic malware detection scan on the application or use a signature-based scanning technique. A forensic malware scan checks a file using information in the file, such as metadata and other file characteristics, to determine whether the file is potentially harmful or suspicious in any way. For example, some applications may have signatures to verify their authenticity or to ensure that they are free of viruses. If an application does not have a signature, it may be considered suspect. A technique known as "generic packer detection" may also be used to identify potentially high risk applications (a "packer" refers to code obfuscation intended to prevent reverse engineering or analysis). At step 506 the forensic malware scan indicates whether the application is suspicious or unusual in any way.

If the application can be verified or authenticated by the malware detection scan, such as by checking a signature in the application or by other means and thus is considered safe, control goes to step 508. There the application executes in the PC's normal operating system environment and is allowed to access the public persistent storage area of the hard disk. On the other hand, if the application cannot be verified at step 506 and, thus, is classified as suspicious or potentially harmful, control goes to step 510 where the application executes in the virtualized environment created by the redirection engine. The application executes as a virtualized application in this environment. The virtualized application may be characterized as executing on the PC's real CPU, rather than on a "virtual" CPU as in the emulator embodiment described above. The virtualized environment is created automatically by the redirection engine. The redirection engine sets up the private persistent storage area and prepares the virtualized environment. The virtualization that occurs by the redirection engine is only file I/O virtualization rather than full environment virtualization. Only an application's file I/O commands may be described as being "virtualized." As noted above, the application still runs on the real CPU, while its file I/O impact is virtualized. For example, the application believes it has modified C:\a.txt, but actually it has only modified a copy of a.txt because the real a.txt is in the public persistent storage area and is not modified (the command to modify a.txt has been virtualized).

At step 512 the virtualized application utilizes the private persistent storage area in the hard disk. In this embodiment, the redirection engine ensures that file I/O commands coming from the virtualized application operate on files stored in the private persistent storage area of the hard disk. These file I/O commands are the same as those discussed above; they primarily include operations to write to or read from a file, delete a file, or create a new file in the hard disk. At this stage the application either continues execution as a virtualized application—accessing the private persistent storage area—or executes in the normal operating environment as described at step 508. Only applications that are potentially harmful are launched in the virtualized environment (see box 405 of FIG. 4). In one embodiment, an application does not switch to the real operating system environment once it is selected to execute in the virtualized environment. The switching between the real operating system and the virtualized environment is generally prohibited in order to protect the PC from potential malware.

Figure 6:
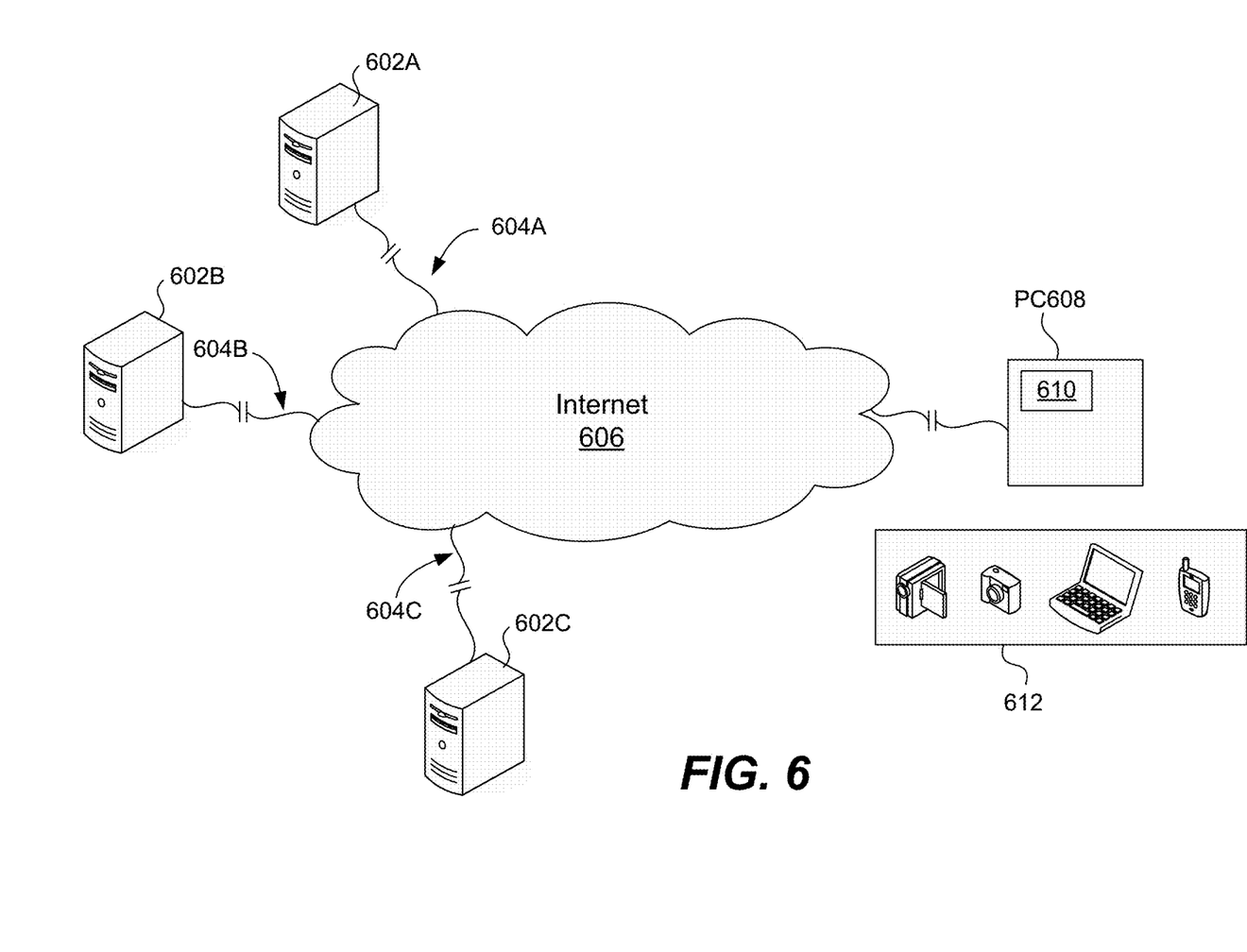
FIG. 6 is a network diagram of an anti-virus in-the-cloud scanning server and a computer attached to external sources.

FIG. 6 is a network diagram showing an AV in-the-cloud service, a PC, and examples of external sources from where potential malware may be downloaded. The diagram shows the AV in-the-cloud service as unavailable or inaccessible. A group of servers 602A, 602B, and 602C are shown having connections 604A, 604B, and 604C with Internet 606. In one example, the connections are down and the servers, which perform conventional AV analysis and protection, are not connected to Internet 606. A PC 608 has a connection to Internet 606 and has an AV agent 610. When the AV in-the-cloud service is up and running, AV agent 610 sends suspicious files to cloud servers 602. FIG. 6 shows the connection between PC 608 and Internet 606 as down. This is another example of how the service may be unavailable. Examples of various external sources are shown as devices 612, including a portable hard disk, a digital camera, a video camera, and a cell phone. As discussed above, when the AV in-the-cloud service is unavailable, applications downloaded from devices 612 may be scanned and sequestered using the methods described above. Once the AV in-the-cloud service becomes available, the files stored in virtual space 510 may be transferred to public storage area 512, as discussed in FIG. 7.

Figure 7:
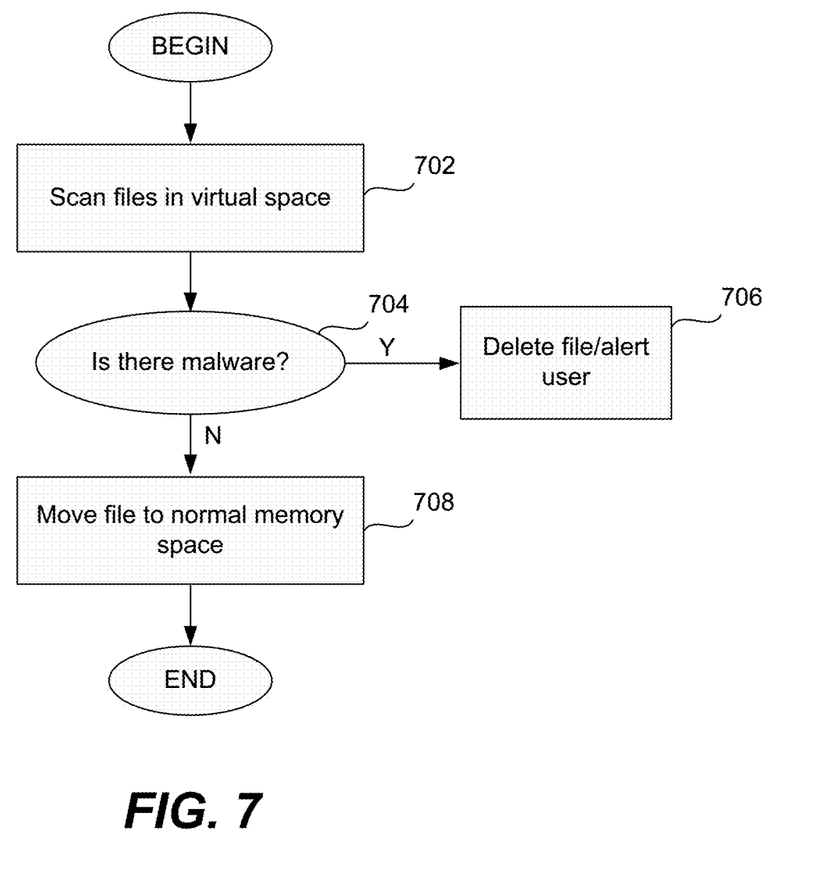
FIG. 7 is a flow diagram of processing virtualized files in a virtual space after the in-the-cloud virus scanner has become accessible by the computer.

FIG. 7 is a flow diagram showing how virtualized files in virtual space 510 are processed after the AV in-the-cloud service is accessible by the PC. For example, the PC may have reconnected to the Internet or the remote servers comprising the in-the-cloud service may have come back online. At step 702 the in-the-cloud scanner scans files stored in the virtual space of the hard disk. Files are sent to the service using agent 610 as is known in the art. For each file that is scanned, at step 704 it is determined whether the file is free of any viruses or malware. If the file is found to be safe, at step 706 it is moved to the public storage area of the hard disk where it can be accessed by normal (i.e., non-virtualized) applications, as well as by virtualized applications which have gone through the process described above. If the file is determined to have malware or some type of virus, control goes to step 708 where the file is deleted or the user is alerted to the potential danger of keeping and using the file, at which stage the process is complete.

FIG. 8 is a logical block diagram of a redirection engine in accordance with the first and second embodiments. A redirection engine 800 has a file I/O command input module

802 for receiving commands from the O/S of the PC as described at step 302 of FIG. 3. A command may be a file I/O command or other type of command. The file I/O command is transmitted by the O/S and is intended to be processed by a storage area processing subsystem (not shown) so that the file may be retrieved from hard disk 803 (or other type of mass storage unit) of the device. Engine 800 also includes a command analysis module 804 arranged to process or evaluate an incoming file I/O command. For example, one function performed by module 804 is determining whether the command was issued by an application in the emulator as described at step 304. Another function of module 804 includes ensuring that the file I/O command is executed in a normal manner if the command is not from an emulated application described in step 306.

A file analysis module 806 examines previous activity performed on the subject file by the emulated application. It determines whether the file is new, whether it has previously been modified by the application, or whether the redirection engine has handled the file in any capacity before receiving the present file I/O command. File analysis module 806 performs this analysis by referring to a file update log 808 which maintains a record of all files previously handled by engine 800. For example, file update log 808 may include a list 813 of file directories, where each directly ends with the file name that was modified, for example, E:\program files\Trend\secrect.exe, C:\a.txt, D:\b.exe, and so on. It may also contain a short description of the activity performed, such as write, delete, read, and the like.

Redirection engine 800 may also have a virtualized I/O platform module 812 which creates the virtualized I/O environment discussed in FIGS. 4 and 5. Module 812 maintains virtualized environment 505 in which unverified or unauthorized applications can execute. The redirection engine may communicate with the hard disk via a storage subsystem of the device. The engine is able to access public and private storage areas of the hard disk depending on the results of the analysis performed on the file I/O command and, if from an emulated program, on the activity history of a specific file. Thus, engine 800 may also contain a hard disk interface 810 used to communicate with storage processing subsystem components in order to retrieve and write to a hard disk 812. Hard disk 812 has a public storage area and a sequestered or quarantined storage area. This storage area is referred to in one embodiment as a private storage area and in another embodiment as a virtual space.

Figure 9A:
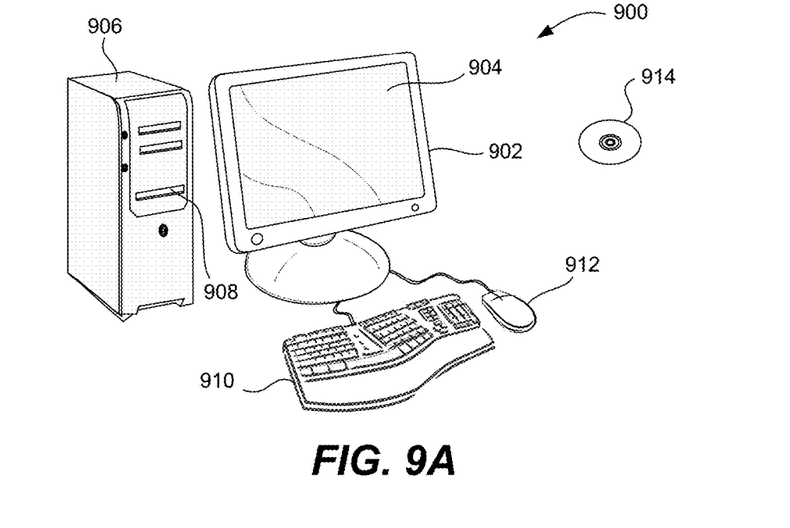
FIGS. 9A and 9B are block diagrams of a computer system suitable for implementing embodiments of the present invention.
Figure 9B:
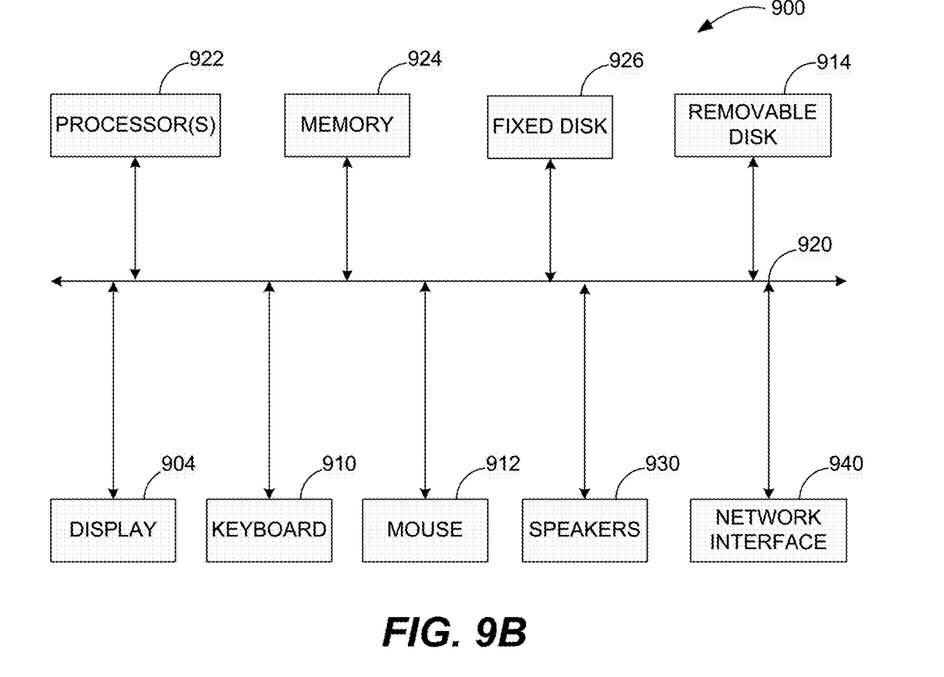

FIGS. 9A and 9B are diagrams of a computer system 900 suitable for implementing embodiments of the present invention. FIG. 9A shows one possible physical form of a computer system or PC as described above. Of course, the computer system may have many physical forms including an integrated circuit, a printed circuit board, a small handheld device (such as a mobile telephone, handset or PDA), a personal computer, a server computer, a laptop or netbook computer, or a super computer. Computer system 900 includes a monitor 902, a display 904, a housing 906, a disk drive 909, a keyboard 910 and a mouse 912. Disk 914 is a computer-readable medium used to transfer data to and from computer system 900.

FIG. 9B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What is claimed is:

1. A method of defending a computing device against malware, the method comprising:

executing an application, the application issuing a file input/output ("I/O") command operating on a file located in persistent storage of said computing device, wherein said persistent storage is a hard disk of said computing device;

transmitting the file I/O command to an operating system of said computing device;

transmitting the file I/O command from the operating system to a redirection module;

analyzing the file I/O command in the redirection module, wherein said file that the file I/O command operates on is not analyzed;

determining whether the application is executing in an emulator program which is executing on said computing device or in an actual operating system of said computing device by checking a process associated with the file I/O command;

determining that the file I/O command is from said application running in said emulator program,     determining that said file has not been previously modified by any application running in said emulator program and that said file I/O command requires modifying said file in said persistent storage of said computing device,     copying said file from a public storage area of said persistent storage to a private storage area of said persistent storage, and     executing the file I/O command and changing said file in said private storage area of said persistent storage, wherein said application running in said emulator program does not execute the file I/O command in said public storage area.

2. A method as recited in claim 1 further comprising:
determining whether the application is executing in said emulator program by examining a process identifier, a process name, a process path or a process hash value of the application.

3. A method as recited in claim 1 further comprising:
examining a file update log.

4. A method as recited in claim 1 wherein the redirection module maintains a log of file updates.

5. A method as recited in claim 1 further comprising:
registering the redirection module with the operating system.

6. A method as recited in claim 1 wherein said analyzing is performed by a command analysis module in the redirection module.

7. A method as recited in claim 1 further comprising:
determining whether the file I/O command is a write command, a modify command, or a delete command.

8. A method as recited in claim 1 wherein said private storage area is not accessible by said operating system of said computing device.

* * * * *

UNITED STATES PATENT AND TRADEMARK OFFICE
CERTIFICATE OF CORRECTION

PATENT NO. : 10,452,817 B1
APPLICATION NO. : 12/420525
DATED : October 22, 2019
INVENTOR(S) : Sun et al.

It is certified that error appears in the above-identified patent and that said Letters Patent is hereby corrected as shown below:

On the Title Page

Item (75), should read as follows:
(75) Inventors: Mingyan SUN, Nanjing (CN);
Chien Ping LO, Yonghe (TW);
Chi-Huang FAN, Sanchong (TW)

Signed and Sealed this
Sixteenth Day of June, 2020

Andrei Iancu
*Director of the United States Patent and Trademark Office*